United States Patent [19]
Christopherson et al.

[11] 3,949,540
[45] Apr. 13, 1976

[54] MOWER DISCHARGE INTERLOCK APPARATUS

[75] Inventors: Herman P. Christopherson, Burnsville; Robert H. Witt; Dennis J. Pavlik, both of Bloomington, all of Minn.

[73] Assignee: The Toro Company, Minneapolis, Minn.

[22] Filed: Aug. 2, 1974

[21] Appl. No.: 494,330

[52] U.S. Cl. ............................................... 56/202
[51] Int. Cl.² ............................................. A01D 35/22
[58] Field of Search ......... 56/202, 320.2, 14.7, 255, 56/10.4

[56] References Cited
UNITED STATES PATENTS

| | | | |
|---|---|---|---|
| 2,786,319 | 3/1957 | Happe et al. ........................ | 56/10.4 |
| 2,917,889 | 12/1959 | Vutz ..................................... | 56/10.4 |
| 2,971,313 | 2/1961 | Smart, Jr. ........................... | 56/320.2 |
| 3,112,597 | 12/1963 | Heth et al. .......................... | 56/202 |
| 3,134,214 | 5/1964 | Shaw .................................... | 56/202 |
| 3,197,949 | 8/1965 | Waag .................................... | 56/202 |
| 3,393,500 | 7/1968 | MacLeod et al. ................... | 56/202 |
| 3,404,519 | 10/1968 | Demers ............................... | 56/14.7 |
| 3,568,421 | 3/1971 | Smith et al. ......................... | 56/255 |
| 3,624,699 | 11/1971 | Hoffmann ............................ | 56/202 |
| 3,797,214 | 3/1974 | Erdman .............................. | 56/320.2 |
| 3,893,284 | 7/1975 | Thon et al. .......................... | 56/202 |

*Primary Examiner*—Russell R. Kinsey
*Attorney, Agent, or Firm*—Merchant, Gould, Smith, Edell Welter & Schmidt

[57] ABSTRACT

An improved arrangement, for a lawn mower having a closable discharge passage, which comprises a bag, means mounting the bag on the housing and handle of the mower with a portion of the mouth of the bag in apposition with the discharge passage, interlock means for preventing the opening of the discharge passage unless the bag is mounted on the housing, and means for opening the full mouth of the bag, to empty mown grass therefrom, and for automatically acting, when the bag is remounted on the mower, to close that portion of the mouth which extends beyond the discharge passage.

9 Claims, 11 Drawing Figures

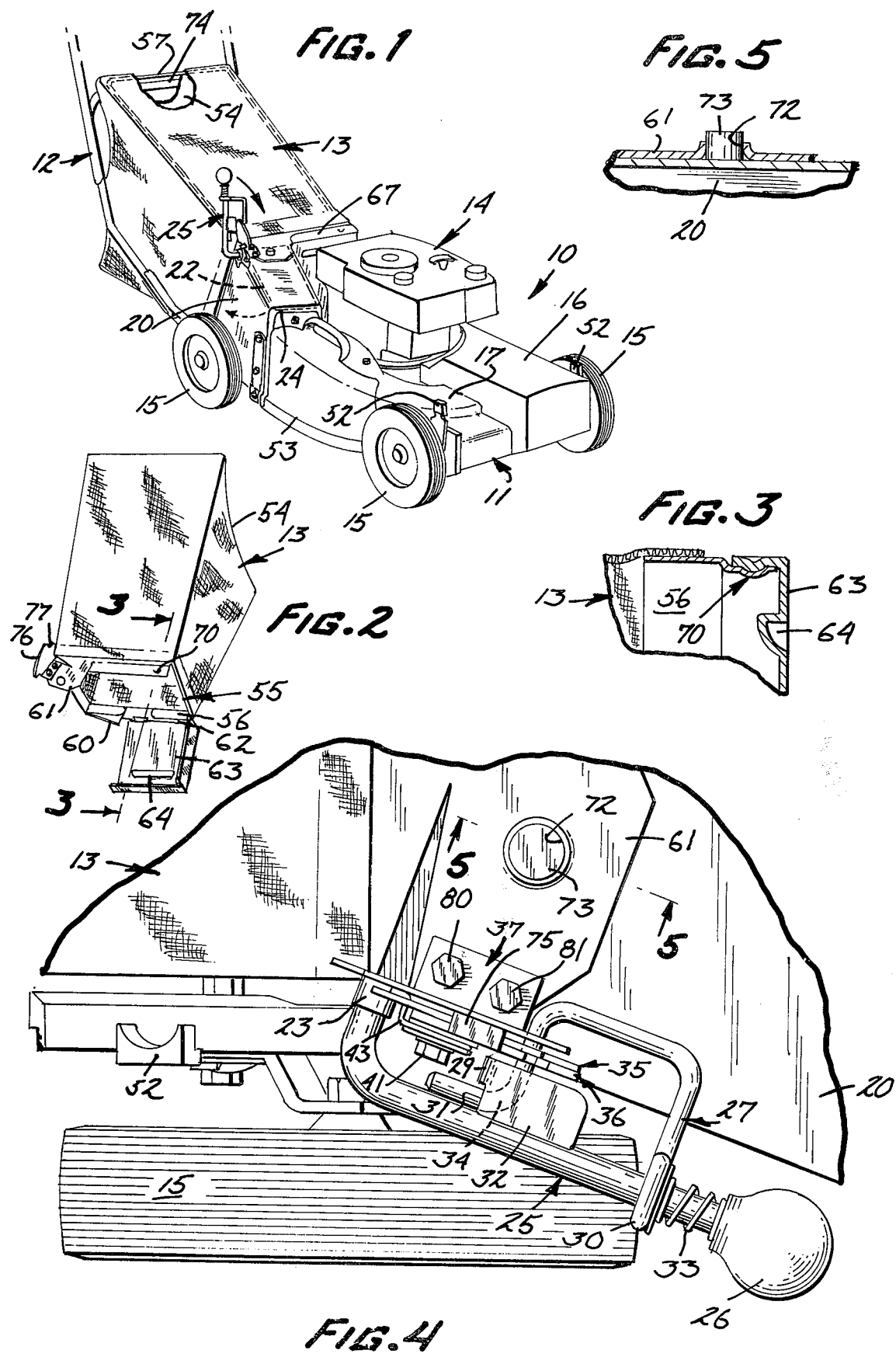

MOWER DISCHARGE INTERLOCK APPARATUS

BACKGROUND OF THE INVENTION

This invention relates to the field of power lawn mowers, and particularly to rotary lawn mowers having provision for bagging the mown grass. Mowers of this sort have a carefully designed housing in which the wind generated by the rapidly rotating blade is directed to carry with it the mown grass, the housing including a "wind tunnel" terminating a discharge passage through which the mown grass is delivered to the bag.

There are occasions where it is desirable to operate such a mower without bagging the mown grass: an example is the use of the mower in mulching operations, where the mown grass is to remain in the area of the cutter blade until it is reduced to suitably small dimensions for depositing directly on the lawn. For these and other purposes a door or closure is provided near the discharge opening, to obstruct the air flow passage and to retain turbulent air movement within the housing: a collecting bag is at this time totally unnecessary.

When a bag is used, its mouth must be properly positioned with respect to the discharge passage when the latter is open. Aerodynamic factors related to the power available from the engine, the speed of the blade, and the porosity of the bag determine the maximum size of the discharge passage for adequate bagging to occur without "dribbling" or deposit of some cuttings on the mown lawn. Experience has taught that a bag mouth of this size is not sufficiently large to enable the bag to be emptied conventionally therethrough, and one expedient to alleviate this is to have a bag with a large second opening to dump cuttings through, together with some means for closing the second opening thereafter.

Of course the bag must be removed from the mower for emptying, and it is desireable for safety reasons to be sure that the mower is not operated in its bagging mode unless the bag is properly installed.

BRIEF DESCRIPTION OF THE INVENTION

The present invention contemplates an arrangement in which a bag is carried in part by the mower housing and in part by the mower handle. The bag is easily removed for emptying by simply lifting it out of its position. It has a closed end, and its mouth, larger than the rear discharge passage of the mower, is provided with releasable means for opening the portion of the mouth area not in apposition with the discharge passage. Interlocking means are provided for normally preventing the bag from being removed unless a closure for the discharge passage is in its closed position, and the passage has a recess into which the closure may be operated so as to present no impediment to the movement of grass through the passage. When the emptied bag is replaced on the mower, the portion of the mouth of the bag not in line with the discharge passage is automatically closed, and the interlock preventing opening of the closure to the discharge passage is released. This arrangement provides a structure which is safe, versatile, convenient, and easy to use, and is substantially foolproof.

It is accordingly an object of the invention to provide a new and improved rotary mower. Another object is to provide such a mower which may be used either for mulching or for bagging, which includes means preventing the discharge opening for bagging from remaining open when the bag is removed therefrom for emptying. Another object is to provide such a mower in which the bag is simply removable by a straight-forward lifting operation. Yet another object is to provide such a mower in which the bag has a mouth end which is large enough to permit convenient emptying of the contents, together with means automatically reducing the size of the mouth to agree with that of the discharge opening when the bag is mounted on the mower. A more specific object of the invention is to provide a new and improved interlock arrangement between two members, which is inoperative except when the members are properly positioned relative to one another.

Various other objects, and advantages, and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing

FIG. 1 is a showing of a mower and bag according to the invention;

FIG. 2 is a view of a bag according to the invention;

FIG. 3 is a fragmentary sectional view taken along the line 3—3 of FIG. 2;

FIG. 4 is a plan view of an interlock arrangement according to the invention;

FIG. 5 is a fragmentary sectional view taken along the line 5—5 of FIG. 4;

DESCRIPTION OF THE PREFERRED EMBODIMENT

Figure 6:
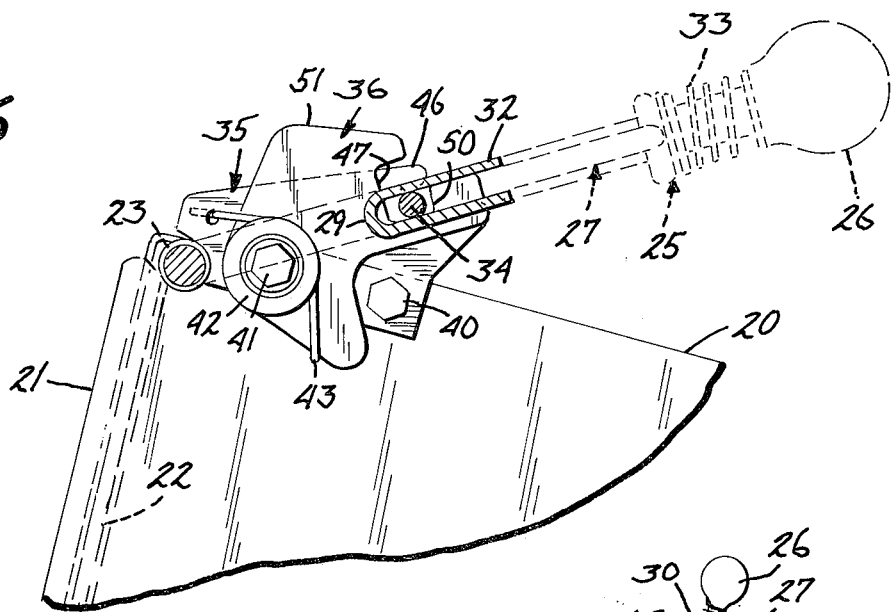
FIGS. 6 and 7 are side elevations partly in section showing the interlock under different conditions.

As shown in FIG. 1 our mower 10 includes a housing 11 from which a handle 12 projects upwardly and rearwardly, and a bag 13 is supported in part by the handle and in part by the housing. An engine 14 is centrally mounted on housing 11 with its drive shaft projecting downward into the housing where it carries the grass cutting blade to spin in a horizontal plane. The housing is carried on wheels 15, which may be driven by engine 14 through a suitable drive train contained in the housing at 16. The upper part of the housing is configured as a "wind tunnel" 17 which is continued as a discharge passage 20. As shown in FIG. 6, passage 20 has an open end 21 which may be closed or occluded by a door or closure member 22 which is pivoted at the top of the discharge opening, as at 23, so that it can move into a second position shown in FIG. 7 where it is contained in a recess 24 at the top of discharge passage 20. In this position closure member 22 presents no impediment to the movement of mown grass outwardly through passage 20. Passage 20 diverges toward its open end.

Closure member 22 is manually actuable between its open and closed positions by an operator 25 unitary with the closure member and having a knob 26 for convenient grasping. A latch bar 27 is slidable along operator 25, and loops around it at one end 30. Bar 27 has a guide member 31 which moves between the walls of a channel 32 carried by operator 25 and bridged at 29. A compression spring 33 urges latch bar 27 toward pivot 23.

Figures 9, 10:
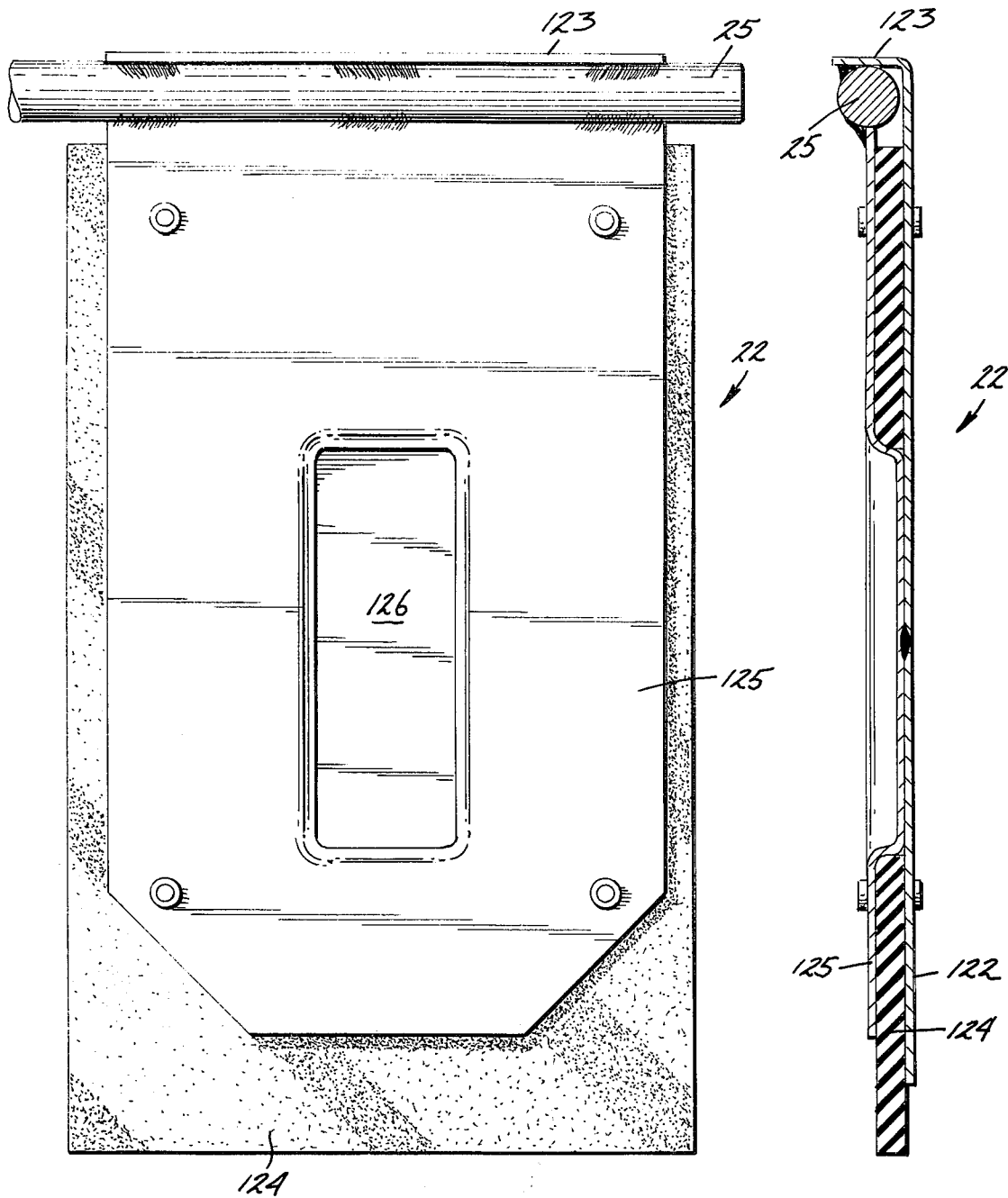
FIGS. 9 – 11 are detail views of a closure member.
Figure 11:
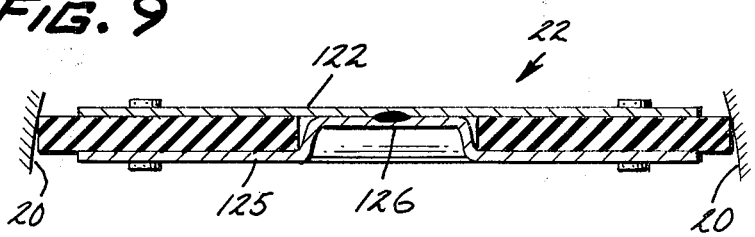

One embodiment of closure member 22 is shown in FIGS. 9 – 11 to comprise a first metal plate 122 bent at its upper end to form a rim 123, a member 124 of resilient material having a central opening, and a second metal plate 125 having a central boss passing through the opening in member 124 and spot welded to plate 122. Rivets may be passed through plate 122, member 124, and plate 125 if desired.

Members 123 and 125 are welded to operator 25. Member 124 extends beyond plates 122 and 125 a short distance on each side, and a considerable distance at the bottom, to make edge contact with the side and bottom wall of discharge passage 20, which tapers slightly inward as suggested in FIG. 1, and the lower corners of plates 122 and 125 are cut off as at 127, 130 to provide additional resilience, so that the closure member may be closed even if some grass lies at the bottom of the discharge passage.

Bar 27 has a cross member 34 which cooperates with a plurality of further members 35, 36 and 37 to give a desired positioning and interlocking action. Stop member 35 and retainer member 36 are secured to the top of the housing, near the discharge opening, by bolts 40, 41, member 35 being fixed and member 36 being made pivotal about the axis of bolt 41 by a spacer 42, and being urged in a counterclockwise direction by a spring 43. Stop member 35 has a notch 44 between a long lip 45 and a short lip 46. Retainer member 36 has a notch 47, including an outward step 50, and an upper release surface 51. When closure 22 and operator 25 are in the closed position, cross member 34 of latch bar 27 rest at the bottom of notches 44 and 47 under the action of spring 33. Step 50 opposes any attempt by the user to draw latch bar 27 outwardly, and lip 46 of member 35 prevents the closure 22 from being opened. Member 37 is carried by bag 13 as will presently be described.

For the sake of completeness, FIG. 1 shows means 52 for adjusting the height of cut of the mower, and also shows a removable cover 53 which may be replaced by a deflector when side dispensing operation of the mower is desired.

The general structure of bag 13 is shown in FIGS. 1 and 2. It has a closed end 54 and a mouth end 55, and is of strong, air permeable material. A frame 56 is provided at mouth end 55, and is continued at 57 inside the top of the bag to give it shape and support. Frame 56 is generally rectangular at the mouth of bag 13, which is secured to the frame by suitable means not shown. A portion of frame 56 has lower and upper members 60 and 61 respectively for cooperation with the opening 21 of discharge passage 20, and pivotally received at its bottom edge 62 is a bag door 63, best shown in FIG. 8. Door 63 has a hand grip element 64, and is provided with a member 65 projecting outwardly at its bottom: a vertical lip 66 projects along the side of the bag, and a horizontal lip 67 projects over the top of frame 56, to which it is held by a resilient catch 70 of any convenient sort.

Figure 8:
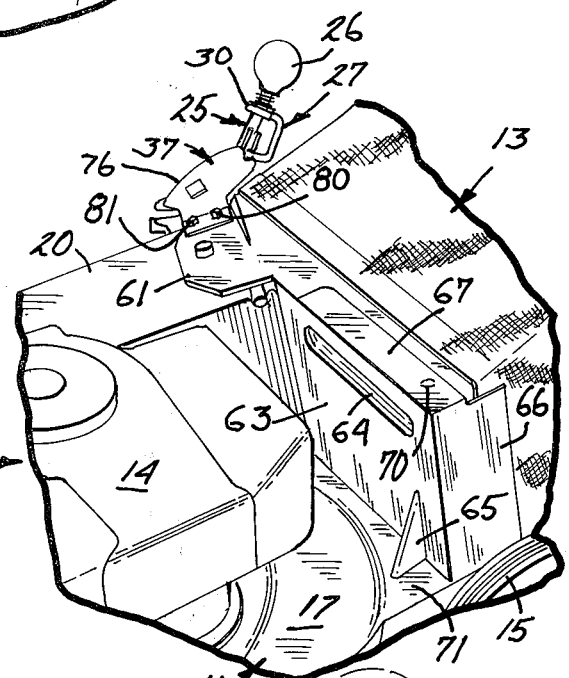
FIG. 8 is a fragmentary view of the invention seen from a different angle.

The lower part of frame 56 rests on the deck 71 of housing 11, as best shown in FIG. 8. The upper part has an aperture 72 which fits over a pin 73 projecting upwardly from housing 11 (See FIGS. 4 and 5). Handle 12 has a lower cross bar 74 upon which the rear top portion of bag 13 may rest. When the bag is properly mounted on the housing, member 37 is so positioned that a lug 75 struck out of the member engages surface 51 of member 36 and pivots the latter about bolt 41 in a clockwise direction, lowering step 50 below lip 45 of member 35 and thus removing any obstacle to the outward displacement of locking bar 27. Member 37 has an arcuate configuration 76, about pivot 23, which terminates clockwise in line with notch 44 in member 35. At the other extreme member 37 is configured with a notch 77, at the position taken by operator 25 when closure 22 is fully open. Member 37 is secured to portion 61 of frame 66 by suitable means such as bolts 80 and 81.

OPERATION

Figure 7:
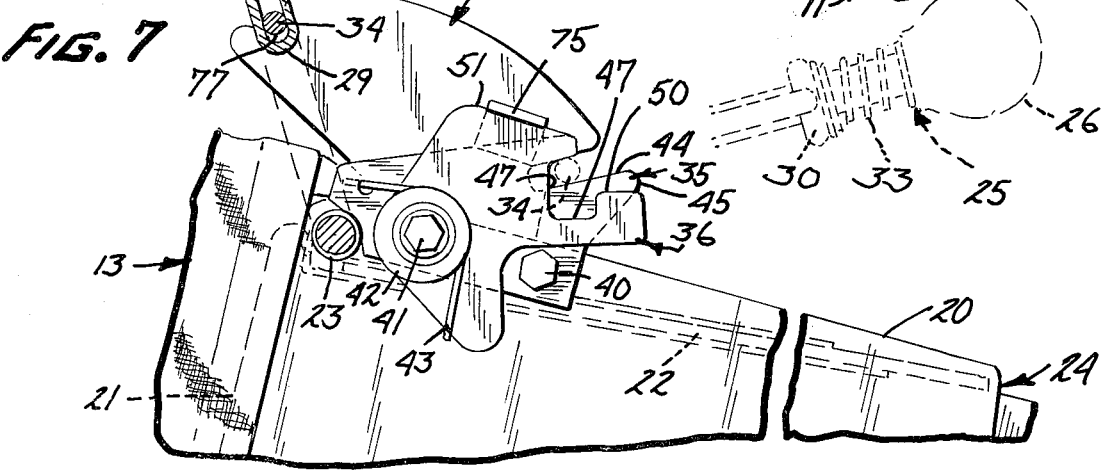

In use, if it is desired to operate the mower in the mulching mode, operator 25 is actuated in a clockwise direction as seen in FIGS. 1, 6, and 7, or counterclockwise as seen in FIG. 8, thus closing the discharge passage.

If bagging operation is desired, operator 25 is actuated in the opposite direction. Closure 22 moves into recess 24 and mown grass is transported into the bag, which it fills from the back forward. When the bag is filled, engine 14 is stopped, operator 25 is actuated to the closed position, when cross member 34 moves into notch 44. The bag is now grasped by member 64 with one hand, the other hand taking the bag at its rear top portion, and the bag is simply lifted straight up. As member 37 is raised, lug 75 allows retainer member 36 to rise until stop 50 bars any outward movement of cross member 34, thus retaining closure 22 in its closed position.

Bag 13 is now turned mouth down over a wheelbarrow, for example, and bag door 63 is allowed to drop open. The entire mouth of bag 13 is now available for the passage of collected clippings which move out easily and rapidly. At this time retainer step 50 prevents withdrawal of latch bar 27 to open closure 22.

The bag is replaced on housing by a reverse operation, member 65 acting to insure that bag door 63 is closed before aperture 72 passes over pin 73, and the bag again rests on deck 71 and discharge passage 20. Lug 75 of member 37 depresses retainer 36 to free notches 44 and 47, operator 25 may now be displaced to open closure 22, restoring bagging operation, and engine 14 may be restarted to resume mowing.

It is to be noted that lower lip 44 engages cross member 34 to prevent the closure member from being driven past the normal closed position by force applied to knob 26.

Numerous objects and advantages of our invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

We claim as our invention:

1. In combination:
   a rotary lawn mower including a housing, configured to define the walls of a recessed rear discharge passage, and handle means extending rearwardly and upwardly from said housing;

closure means pivotally mounted in said housing at said discharge passage for movement between a first position, in which it occludes said passage, and a second position, in which it is withdrawn into the recess of said passage to fully open said passage;

a removable grass catching bag for said mover having a closed end for support by said handle means and a mouth end larger than said discharge passage;

frame means, for the mouth end of said bag, including means securing said bag to said housing at said discharge passage;

and means carried in part by said housing and in part by said frame means, and interlocked with said closure means, for normally preventing opening of said passage unless said bag is secured to said mower.

2. In combination:

a rotary lawn mower including a housing, having a rear deck and configured to define a recessed rear discharge passage, and handle means extending rearwardly and upwardly from said housing;

closure means pivotally mounted in said housing at the top of said discharge passage for movement between a first position, in which it occludes said passage, and a second position, in which it is withdrawn into the recess of said passage to fully open said passage;

a removable grass catching bag for said mower having a closed end for support by said handle means and a mouth end larger than said discharge passage;

frame means, for the mouth end of said bag, including means for supporting said bag on said deck and means securing said bag to the top of said housing at said discharge passage;

and means carried in part by said housing and in part by said frame means, and interlocked with said closure means, for normally preventing opening of said passage unless said bag is secured to said mower.

3. Apparatus according to claim 1 together with means pivotally secured to said frame means for releasably closing the portion of said mouth end which extends beyond said discharge passage.

4.

a rotary lawn mower including a housing configured to define a discharge passage for mown grass;

closure means pivotally mounted in said housing at the discharge end of said passage for movement between a first position, in which it occludes said passage, and a second position, in which it presents no impediment to the movement of mown grass through said passage;

a grass catching bag for mounting on said housing in apposition with said passage to receive mown grass discharged therefrom;

a closure operator connected to said closure means and movable through an arcuate range to cause said movement of said closure means, and including a radially releasable latch bar;

means carried by said housing for cooperating with said latch bar to hold said closure operator in a position in which said closure means is in its first position;

retaining means carried by said housing for normally preventing release of said latch bar from said latch means;

and means carried by said bag and effective when said bag is mounted on said housing to disable said retaining means.

5. Apparatus according to claim 4 together with means cooperating with said latch bar to releasably retain said closure operator in a position in which said closure means is in its second position.

6. In combination:

a rotary lawn mower including a housing configured to define the inner walls of a discharge passage;

closure means mounted in said housing at said discharge passage for movement between a first position, in which it occludes said passage, and a second position, in which it fully opens said passage;

a removable grass catching bag mounted on said mower and having a mouth end larger than said discharge passage;

frame means for the mouth end of said bag, including means securing said bag to said housing;

and means carried in part by said housing and in part by said frame means, and interlocked with said closure means, for normally preventing movement of said closure member out of said first position unless said bag is secured to said member.

7. Apparatus according to claim 1 in which said closure means comprises two rigid members and a resilient member secured therebetween and projecting laterally therebeyond for edge contact internally with a wall of said discharge passage in the closed position of said member.

8. Apparatus according to claim 7 in which said closure means is mounted at the top of said passage and said resilient member projects downwardly beyond said rigid members for a significant distance, whereby to enable said closure member to reach its closed position even though mown grass may lie on the floor of the discharge passage.

9. Apparatus according to claim 7 together with means for cooperating with said latch bar to prevent said closure means from being forced beyond the normal closed position thereof.

* * * * *